(12) United States Patent
Allen et al.

(10) Patent No.: US 8,064,581 B1
(45) Date of Patent: *Nov. 22, 2011

(54) METHOD OF ASSOCIATING MULTIPLE PREPAID CARDS WITH A SINGLE ACCOUNT

(75) Inventors: Brett Donaldo Allen, Jersey City, NJ (US); Robert D. Carvelli, Flemington, NJ (US); Gary A. Smith, Annandale, NJ (US); Robert M. Stanchina, Oxford, NJ (US); Clifford L. Young, Bentonville, AR (US)

(73) Assignees: AT&T Intellectual Property II, L.P., Atlanta, GA (US); New York University, New York, NY (US)

( * ) Notice: Subject to any disclaimer, the term of this patent is extended or adjusted under 35 U.S.C. 154(b) by 1036 days.

This patent is subject to a terminal disclaimer.

(21) Appl. No.: 11/897,685

(22) Filed: Aug. 30, 2007

Related U.S. Application Data

(63) Continuation of application No. 10/183,084, filed on Jun. 27, 2002, now Pat. No. 7,280,645.

(51) Int. Cl.
*H04M 15/00* (2006.01)
*H04M 11/00* (2006.01)

(52) U.S. Cl. ........... 379/114.2; 379/114.15; 379/114.17; 379/144.01; 455/407; 455/408

(58) Field of Classification Search ............. 379/114.15, 379/114.16, 114.17, 114.18, 114.2, 114.26, 379/144.01; 455/40, 408

See application file for complete search history.

(56) References Cited

U.S. PATENT DOCUMENTS

| | | | | |
|---|---|---|---|---|
| 5,276,444 A | * | 1/1994 | McNair | 340/5.8 |
| 5,353,335 A | * | 10/1994 | D'Urso et al. | 379/114.2 |
| 5,359,642 A | * | 10/1994 | Castro | 379/121.01 |
| 5,995,822 A | * | 11/1999 | Smith et al. | 455/406 |
| 6,021,189 A | * | 2/2000 | Vu | 379/114.17 |
| 6,115,613 A | * | 9/2000 | Jonsson | 455/519 |
| 6,320,847 B1 | * | 11/2001 | Agrawal et al. | 370/238 |
| 6,480,591 B1 | * | 11/2002 | Penfield et al. | 379/144.01 |
| 6,529,593 B2 | * | 3/2003 | Nelson | 379/114.2 |
| 6,618,583 B1 | * | 9/2003 | Ergezinger | 455/406 |
| 6,741,686 B2 | * | 5/2004 | Bekkevold et al. | 379/114.2 |
| 7,123,608 B1 | * | 10/2006 | Scott et al. | 370/353 |
| 7,286,655 B2 | * | 10/2007 | Voorman et al. | 379/114.2 |
| 7,747,241 B1 | * | 6/2010 | Magnotta et al. | 455/406 |
| 2001/0028705 A1 | * | 10/2001 | Adams et al. | 379/114.2 |
| 2002/0101966 A1 | * | 8/2002 | Nelson | 379/114.01 |

* cited by examiner

*Primary Examiner* — Binh Tieu

(57) ABSTRACT

A set of multiple prepaid calling cards that are associated with a single account is disclosed. A predetermined amount of minutes is associated with the set of cards. Cards within the set can be used simultaneously and extract minutes from the account in predetermined increments. Each card can use the same Personal Identification Number (PIN) or each card can have its own unique PIN. In some instances, any card in the set can recharge the account, (i.e., add more minutes to the account), or in some embodiments, only a control card can add minutes to the account.

15 Claims, 8 Drawing Sheets

METHOD OF ASSOCIATING MULTIPLE PREPAID CARDS WITH A SINGLE ACCOUNT

This application is a continuation of prior application Ser. No. 10/183,084 filed Jun. 27, 2002 now U.S. Pat. No. 7,280,645, which is incorporated herein by reference.

FIELD OF THE INVENTION

The present invention is directed to a method of associating multiple prepaid cards with a single account, and more particularly, to a method of linking multiple prepaid cards to a predetermined amount of minutes such that each card can simultaneously draw minutes from the same account.

BACKGROUND OF THE INVENTION

Many people use prepaid telephone calling cards as an easy and reliable way to make long distance telephone calls from any telephone. People appreciate the convenience of the cards as well as the benefit of knowing beforehand how much a call will cost per minute. Another benefit of prepaid cards is that because the cards have a defined limit (e.g., typically in terms of minutes or dollars), people know that in the case of theft, the resulting loss to the person is readily discernible and limited to the remaining balance on the prepaid card.

One drawback to prepaid cards is that each card is treated like a separate account from the perspective of the prepaid card provider. As such, people who wish to provide multiple people with cards must purchase separate cards and track each card's usage separately. Since prepaid cards providers do not provide call detail records, it is not possible to discern any information about the prepaid card user other than the fact that the minutes have been depleted. Typically, the current solution has been to provide traditional calling cards to those people. However, there are a number of disadvantages to traditional calling cards.

One disadvantage is that the typical per minute charge for calling cards is significantly higher than the per minute charge for prepaid cards. A second disadvantage is that the calling card usually has no preset limit either in terms of dollars or minutes. As such, if someone abuses the privilege of having the card or the card is stolen, significant charges can be made to the card. Finally, using a calling card presupposes a long-term commitment that results in monthly or periodic billings. Again, the costs attributable to the calling cards are unknown and not easily controlled. There is a need for multiple prepaid cards that can be associated with a single account and can be used simultaneously.

SUMMARY OF THE INVENTION

The present invention is directed to a set of multiple prepaid calling cards that are associated with a single account. A predetermined amount of minutes is associated with the set of cards. Cards within the set can be used simultaneously and extract minutes from the minutes in predetermined increments. Each card can use the same Personal Identification Number (PIN) or each card can have its own unique PIN. In some instances, any card in the set can recharge the account, (i.e., add more minutes to the account), or in some embodiments, only a control card can add minutes to the account.

In the case of each card having a different PIN, rules can be established for each card. Limits can be placed on a particular card with respect to minutes used in a defined time period (e.g., hour, day or week). Record detail can also be provided for each card to determine number of calls made, duration of calls, etc.

BRIEF DESCRIPTION OF THE DRAWINGS

The present invention is illustrated by way of example and not limitation in the accompanying figures in which like reference numerals indicate similar elements and in which.

DETAILED DESCRIPTION

Figure 1:
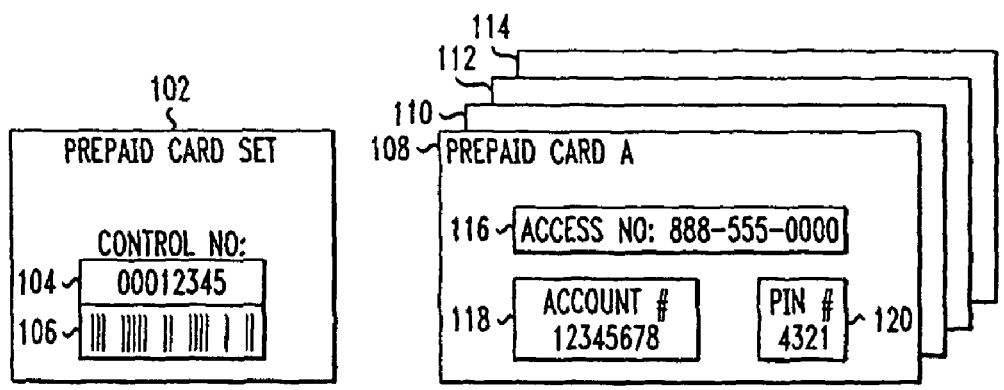
FIG. 1 illustrates an exemplary set of multiple prepaid cards in accordance with the present invention.

The present invention is directed to a method for associating multiple prepaid cards with a single account. FIG. 1 illustrates an exemplary set of prepaid cards in accordance with the present invention. Included with the set of prepaid cards is a sales card 102. A merchant (i.e., Point of Sale (POS)) uses the sales card 102 to validate and activate the card set upon purchase. The sales card 102 includes a control number 104 that is used by the merchant to activate the card set. A bar code 106 representation of the control number may also be included on the sales card 102.

The set of prepaid cards 108-114 upon activation may be distributed by the purchaser to a group of people for their individual use. Each prepaid card 108-114 includes a telephone number (e.g., a 8YY number), which when dialed, allows the user to place a call upon validation of the card and the availability of minutes as will be described in detail hereinafter. Each card also includes an account number 118 and a PIN 120. Each card may include the same account number and PIN or different account numbers and/or PINS.

Figure 2:
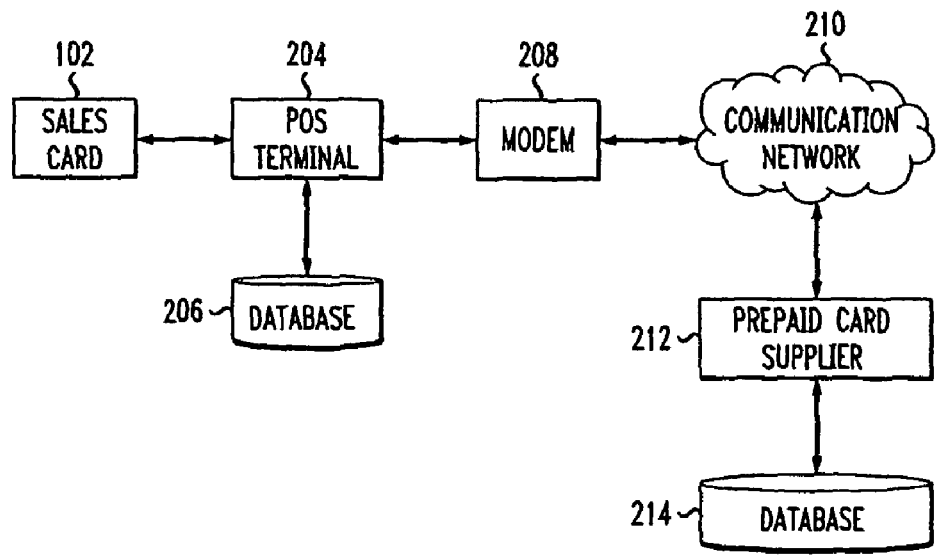
FIG. 2 illustrates a block diagram of a Point of Sale (POS) set-up for activating a set of multiple prepaid cards in accordance with the present invention.

FIG. 2 illustrates a block diagram of a POS setup for activating the prepaid card set. Upon purchase of a multiple prepaid card set, the control number of the sales card 102 is inputted into a POS terminal 204. The POS terminal 204 may be associated with a cash register (not shown) used by the merchant or may be part of a kiosk used for dispersing prepaid cards. The control number may be scanned by the POS terminal via the barcode or may be typed in using a keypad (not shown).

Once the control number is entered, it is stored in a database 206 associated with the POS terminal 204. The database 206 may be used by the merchant to keep track of sales of the prepaid cards for inventory purposes and to notify the prepaid card supplier of a sale so that the card can be activated. The control numbers are communicated to the prepaid card supplier over a communication network 210. It is to be understood by those skilled in the art that the control numbers may be communicated at the time of purchase, periodically (e.g., every six hours) or at an established time of day (e.g., overnight).

The POS terminal 204 connects to the communication network 210 via a modem 208 that uploads the control numbers and communicates them to a prepaid card supplier server 212. The prepaid card supplier server activates the associated prepaid card set and establishes an account for the prepaid card set. The account includes the number of cards in the set, the number of minutes associated with the account, and any limits that may be placed on the account. It is to be understood by those skilled in the art that limits applied to any or all of the cards may be established at the time of purchase or at a later time by one of the prepaid card users as will be described in detail hereinafter.

Figure 3:
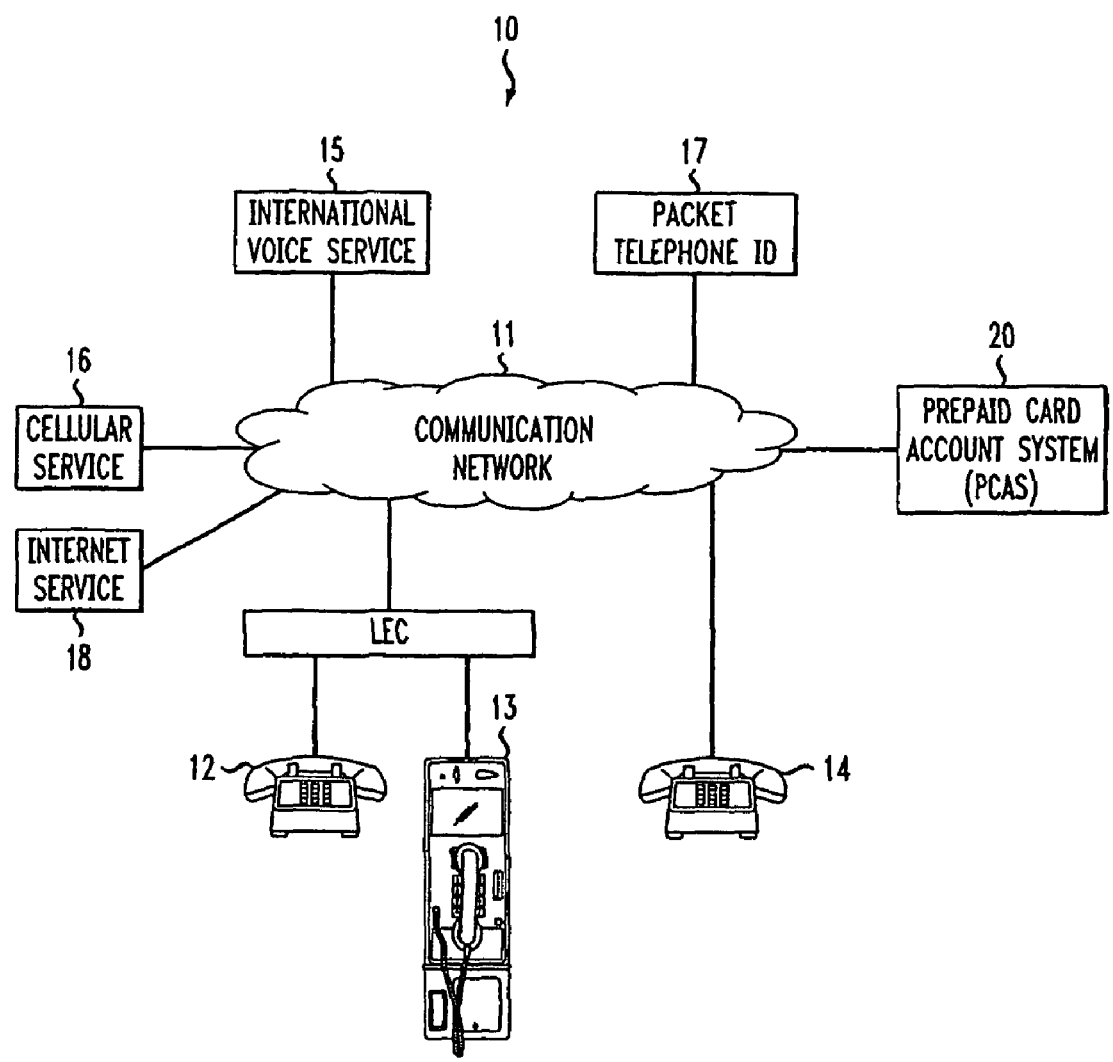
FIG. 3 illustrates a network architecture in which a call can be initiated using one of the multiple prepaid cards in accordance with the present invention.

Referring to FIG. 3, there is shown network architecture for initiating a call using one or more of the multiple prepaid cards associated with the same account in accordance with the present invention. A communication network 11 provides telecommunication services, such as standard voice services via standard phones 12 and 13, pay phone 14, international voice service 15, cellular service 16, packet telephone service 17 and Internet service 18. Standard voice services carried over communication network 11, such as Plain Old Telephone Service (POTS), long distance services, voice-messaging services, and "toll-free" services are accessed through a Local Exchange Carrier (LEC) in a well-known manner, or by direct connection to the communication network 11.

Communication network 11 includes a Prepaid Card Account System (PCAS) 20. PCAS 20 processes and stores all information pertaining to each prepaid card account including, but not limited to, the number of cards per a given account, the number of available minutes, validation information (e.g., PINs for each card), as well as any account profiles. Account profiles may include certain call restrictions which may be defined by time limits, geographical boundaries, number of calls in a predefined period of time or any other parameter defined by the establisher of the account or the prepaid card provider.

Figure 4:
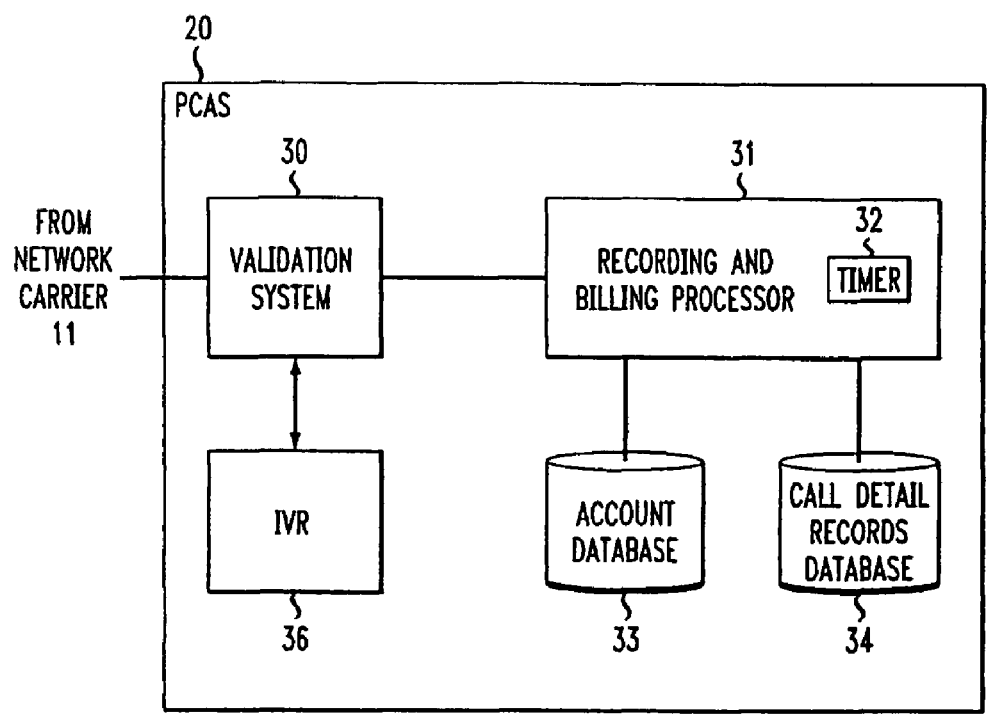
FIG. 4 illustrates a schematic block diagram of the prepaid card account system of FIG. 3 in more detail.

FIG. 4 illustrates the PCAS 20 in more detail. PCAS 20 includes a validation system 30, an Interactive Voice Response (IVR) unit 36, a recording and billing processor 31, an account database 33 and optionally a call detail records database 34. The IVR unit 36 announces to the user a series of options for initiating a prepaid call via the validation system 30. Among the provided options is a request for the user's account number and PIN. Validation system 30 receives the account number and PIN entered by the prepaid card user. The validation system 30 queries the account database 33 to determine if the account number and PIN are valid using known techniques. The account database 33 is also queried upon validation to determine if any calling restrictions apply to the account. In accordance with the present invention, the validation system 30 is capable of simultaneously or contemporaneously validating multiple prepaid cards associated with the same account.

Recording and billing processor 31 includes a timer 32 for recording the length of a given call and also for distributing minutes to one or more of the multiple prepaid cards as will be described in detail hereinafter. Recording and billing processor 31 is also able to determine per minute charges for calls (e.g., international calls either originating or terminating in a foreign country). The per minute charges are then used to "calculate" minute usage. For example, for a standard domestic call, the per minute charge may be 5 cents per minute. However, a call to Great Britain may be 25 cents per minute. As such, an international minute in this context is equivalent to 5 domestic minutes (e.g., five 5 cent per minute minutes equals one 25 cent per minute).

Call detail records database 34 stores billing records relating to each multiple prepaid card account, both in terms of the account as a whole and records relating to each individual card. Such information may be provided to the prepaid account holder for purposes of auditing the call patterns for a particular card user.

Figure 5A:
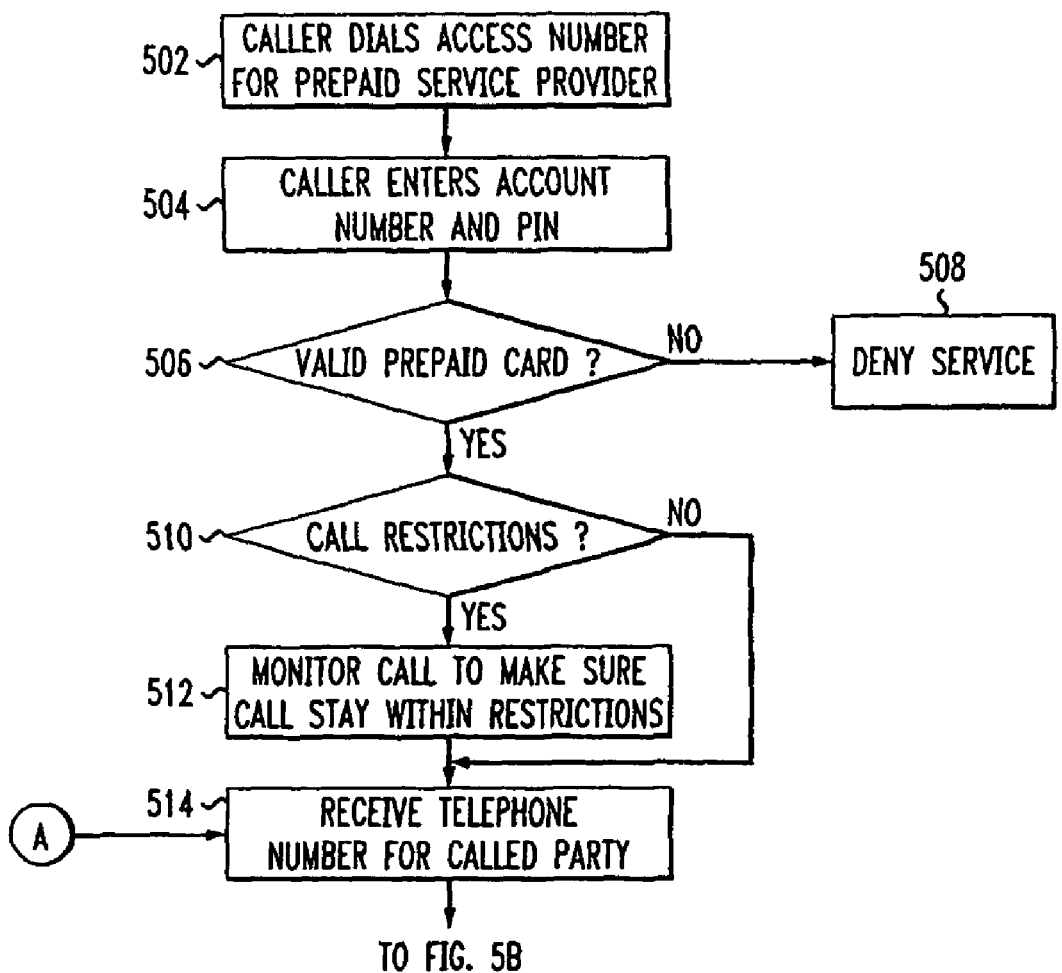
FIGS. 5A and 5B illustrate a flow chart in which a user of one of the multiple prepaid cards makes a call in accordance with the present invention.
Figure 5B:
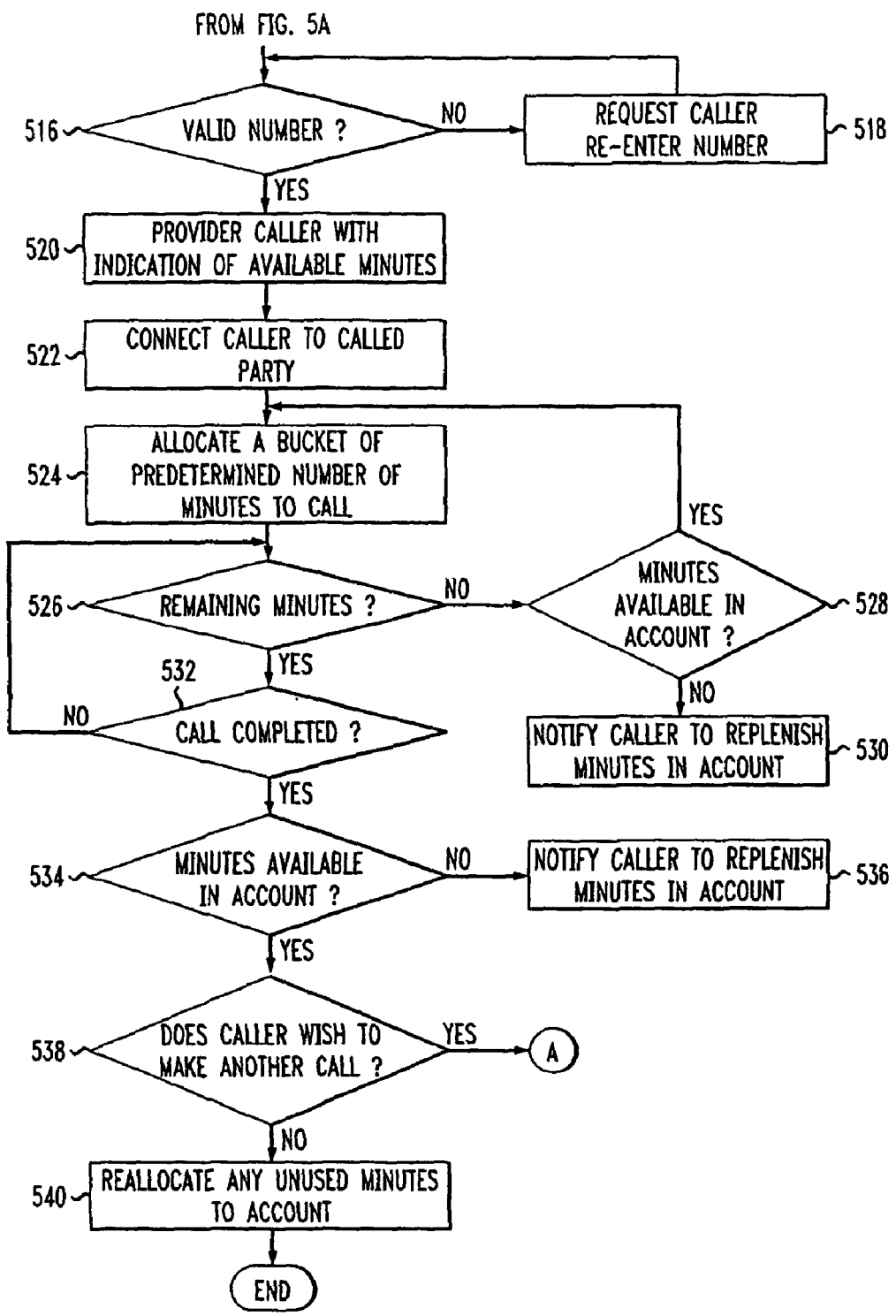

FIGS. 5A and 5B illustrates the steps required for a user of one of the multiple prepaid cards associated with a single account to place one or more calls and, in particular, the scheme used to allocate minutes to a user of a multiple prepaid card account in accordance with an embodiment of the present invention. A user of one of the multiple prepaid cards (also referred to as a caller) enters the access number for the prepaid service provider (step 502). The access number may be a toll free number such as an 8YY number. An Interactive Voice Response (IVR) unit 36 announces to the caller a series of options in which each option is associated with a prompt. Such prompts may include a selection of language in which any additional instructions are provided and a request for the caller to provide his account number and PIN (i.e., login information).

The caller enters the account number and PIN associated with his particular card (step 504). The PIN may be a series of numbers or alphanumeric characters of a particular length (e.g., between 8-12 characters). It is to be understood by those skilled in the art that the PIN for each card in a particular multiple card account may be the same or different. A determining factor of which scheme is used would depend on the necessity to provide account activity on a per card basis. The validation system 30 then determines if the received login information is valid by looking up the login information in the account database 33 (step 506). If the login information is not valid, further service is denied (step 508).

If the login information is valid, the account database 33 is further queried to determine if the caller's card is subject to any call restrictions (step 510). As indicated above, examples of call restrictions may include restrictions on the hours of the day in which calls can be made (e.g., between 9 AM and 6 PM), days of week, restricted call destinations, restricted lengths of calls restricted call origination locations, etc. If call restrictions apply to the caller's card, any succeeding calls are monitored to ensure that the restrictions are maintained. If no card restrictions are applicable, processing of the card continues.

The IVR unit 36 then prompts the caller to enter the destination telephone number for the call that he wishes to complete (step 514). The caller may enter the telephone number by using the keypad associated with the caller's telephone to transmit Dual Tone Multi-Frequency (DTMF) signals, by speaking the telephone number if the PCAS includes voice recognition capabilities, or by typing the number on a computer keyboard if the call is being made over a packet network.

Once the PCAS 20 receives the telephone number, the PCAS determines if the number is valid (step 516). Validity of the telephone number may be determined in light of the call restrictions applicable (e.g., the caller may not be able to make any or certain international calls), whether the received number is in fact a valid telephone number or in light of other call restrictions (e.g., time of day, number of minutes used by caller, etc.). In some embodiments of the present invention, in addition to determining validity of the received telephone number, the PCAS 20 may also determine a per minute charge applicable for the particular call. While it is common in the current art for minutes attributed to a prepaid card to be consistently priced (e.g., 5 cents per minute), it is conceivable that different per minute charges could be applied based on the destination of the call. Such pricing would be expected, in particular, if the card was authorized for both domestic and international calls. Alternatively, a different per minute charge may arise if the call originates from a location outside of the U.S.

In either embodiment, once the destination telephone number is received, the PCAS 20 determines the number of minutes available to the caller and informs the caller of the available minutes (step 520). Again; the minutes communicated to the caller may vary depending upon the restrictions applicable to the caller. For example, the caller may be entitled to use all available minutes attributed to the account (e.g., 200 minutes). However, if the caller has a length of call restriction, the maximum number of minutes for the call may be significantly smaller (e.g., 30 minutes).

Assuming that there are minutes attributed to the account and no restrictions are applicable to the call, the destination telephone number is used to route the call and the caller is connected to the called party if the called party answers the call (step 522). Upon connection of the call, a predetermined amount or bucket of minutes from the account is allocated to the caller's call. For example, the minutes could be allocated in 10-minute increments. As will be described in more detail hereinafter, the allocation of minutes is required to ensure that in the case of simultaneous calls made by multiple user's of a single multiple prepaid account, each card user is able to receive minutes for their calls and the minutes are not monopolized or depleted by a single card user.

The PCAS 20 periodically checks to determine if a given bucket of minutes have been depleted by the caller (step 526). Once a bucket of minutes are depleted, the PCAS 20 determines if there are minutes left in the account (step 528). If no minutes remain in the account, the caller is notified that the account minutes need to be replenished (step 530). Depending on the particular embodiment of the present invention, the caller may be able to replenish the minutes by providing the appropriate information to the PCAS 20 (e.g., authorize the PCAS 20 to bill a revolving account or credit card account). Alternatively, only limited card users within the account may be able to replenish the account. In such an event, the authorized card user would be notified.

If the particular bucket of minutes is not depleted, a check is performed to determine if the call has been completed (step 532). If the call is not completed, steps 526-530 are repeated. If the call is completed, a check is made to determine if there are any minutes remaining in the account balance (step 534). If minutes are not available, the caller is notified that the account balance needs to be replenished (step 536). If there are minutes available, the caller is prompted by the IVR unit 36 to determine if the caller wishes to make another call (step 538). If the caller does not wish to make another call, any remaining allocated minutes are returned to the account balance and the interaction between the caller and the PCAS 20 is ended (step 540). If the caller wishes to make an additional call, steps 514-540 are repeated.

Figure 6A:
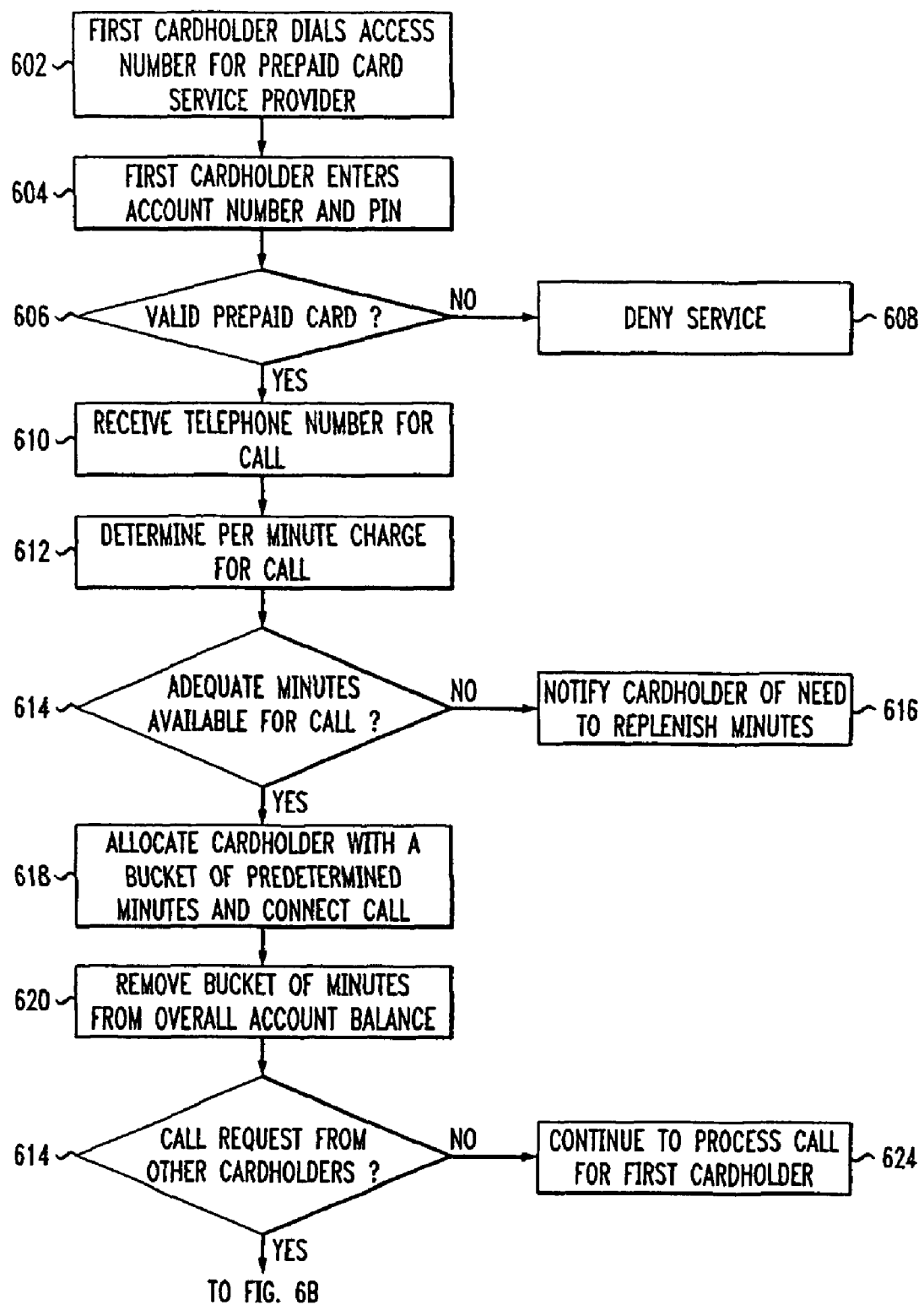
FIGS. 6A-6C illustrate a flow chart in which multiple prepaid card users associated with a single prepaid card account can simultaneously extract minutes from the account in accordance with the present invention.
Figure 6B:
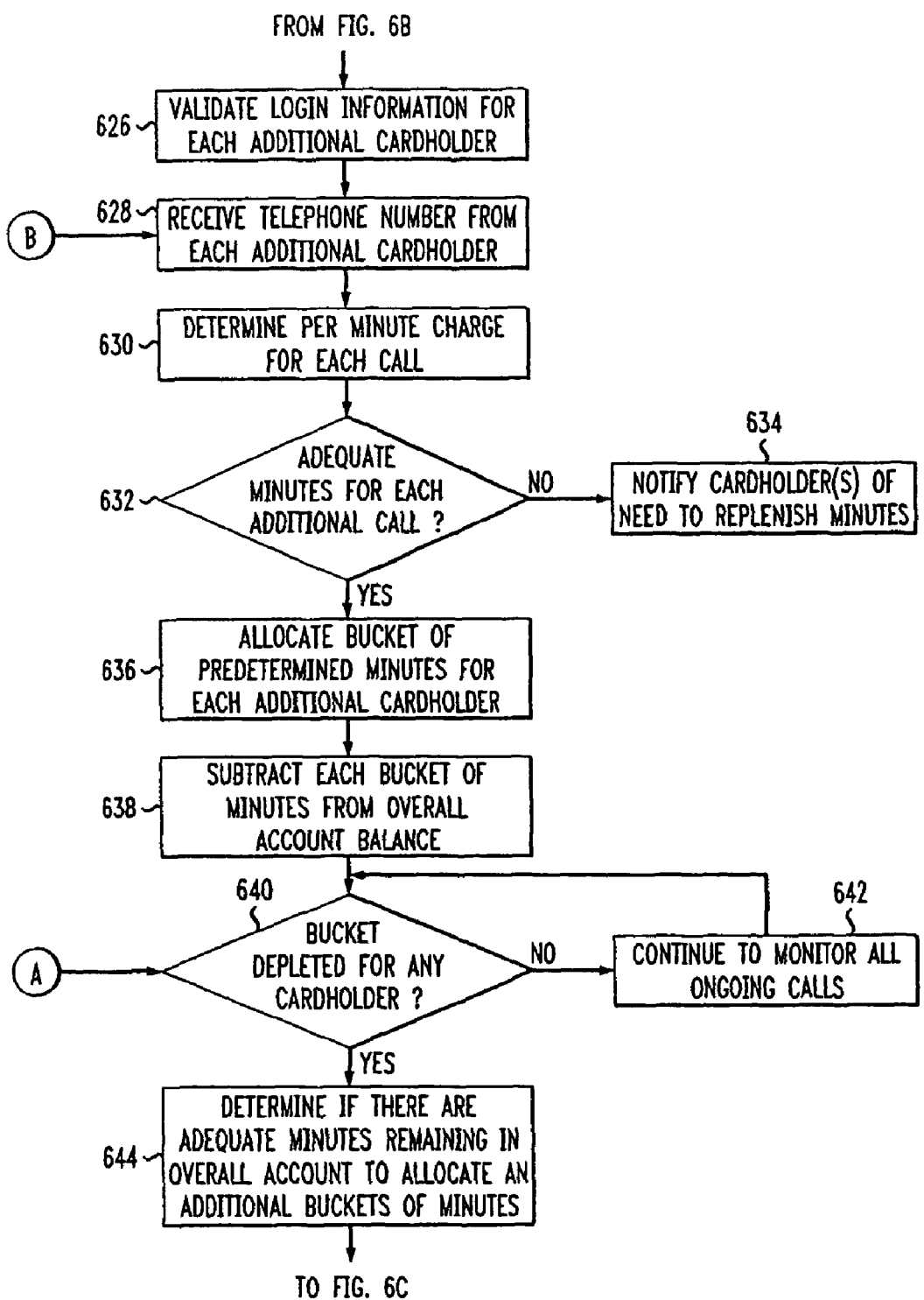
Figure 6C:
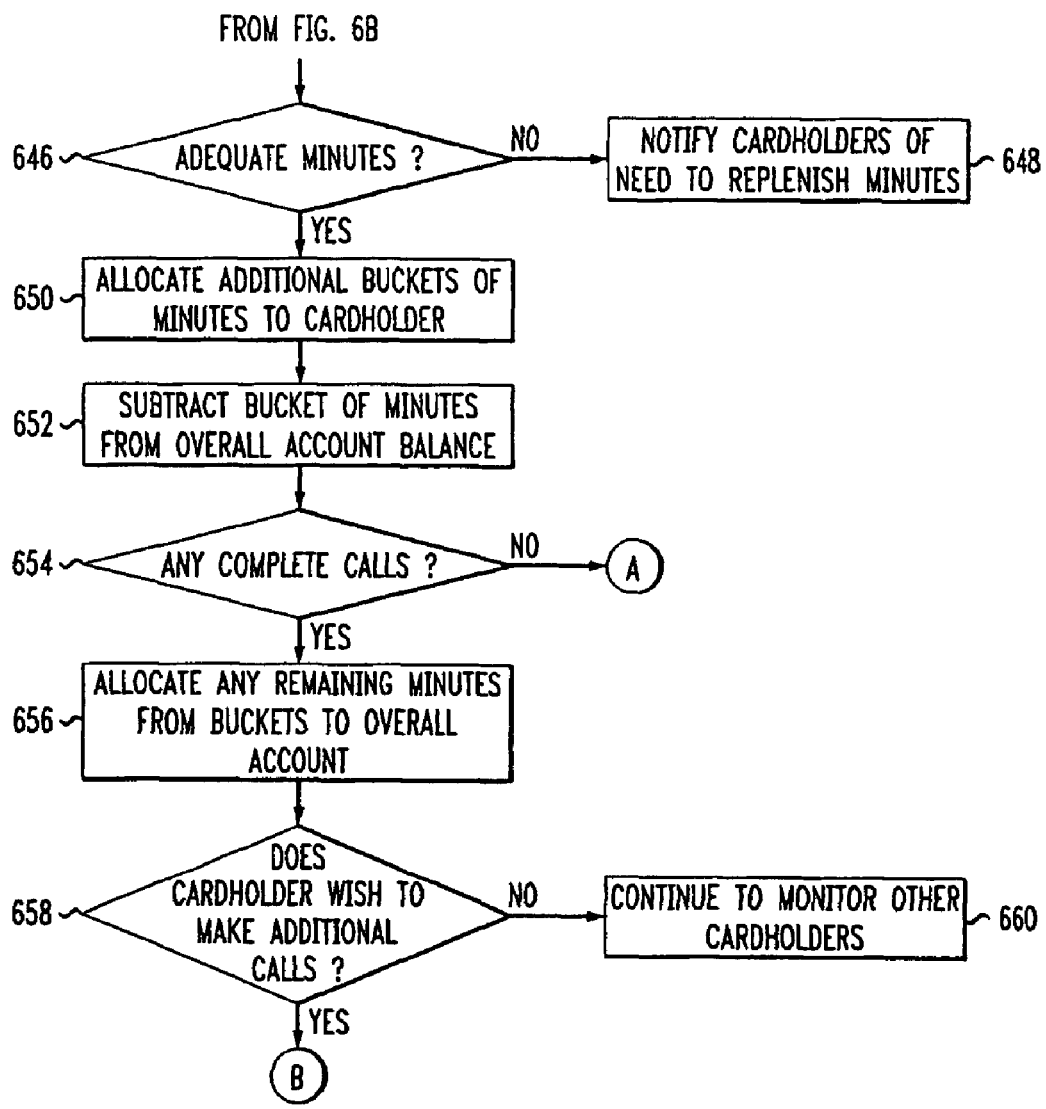

FIG. 6 illustrates how the scheme described above is used to allocate and monitor account usage when more than one card associated with the account are in use simultaneously. As described above, a first cardholder dials the access number for the prepaid card service provider (step 602). The first cardholder enters the account number and PIN associated with his particular card (step 604). Next; a check is performed by PCAS to determine if the card is valid (step 606). If the card is not valid, service is denied (step 608).

If the card is valid, the first cardholder is prompted to provide the destination telephone number for the call that he wishes to make (step 610). Provided that the telephone number is not subject to any restrictions associated with the first cardholder, the PCAS determines the per minute charge for the call (step 612). As indicated above, some calls may be priced differently depending either upon the origination of the call (e.g., overseas or international origination) and the destination of the call (e.g., international call). Regardless of whether the account is measured in terms of minutes or dollars, the cost for the particular call may have a different impact on the account balance.

Once the determination is made, the PCAS determines whether there are adequate minutes available in the overall account to complete the call (step 614). The determination of adequate minutes is based on the bucket of predetermined minutes that will be allocated to the first cardholder. If there are not adequate minutes to allocate a bucket, the cardholder is notified of the need to replenish minutes in the account (step 616).

If there are adequate minutes in the account, the PCAS allocates a bucket of predetermined minutes (e.g., 10 minutes) to the cardholder and connects the call (step 618). The bucket of minutes is then subtracted from the overall account balance (step 620). The PCAS then monitors additional call requests from other cardholders (step 622). If no additional call requests are received, the PCAS continues to process the call for the first cardholder (step 624).

If call requests are received from additional cardholders, the PCAS validates login information (i.e., account number and PIN) for each additional cardholder (step 626). Once validated, the destination telephone number is received from each additional cardholder (step 628). The per minute charge is then calculated for each call based on the origination location of the call and the destination telephone number (step 630). For each call request, a determination is made as to whether there are adequate minutes available in the overall account to complete the calls (step 632). This determination is made on a call-by-call basis. If there are not adequate minutes to complete any of the calls, those call holders are notified of the need to replenish minutes in the overall account (step 634).

If there are adequate minutes available for the additional call requests, a bucket of predetermined minutes is allocated for each call request (step 636). Each bucket of minutes allocated to an additional cardholder is then subtracted from the overall account balance (step 638). The PCAS then monitors each call to determine if a bucket of minutes for a particular call has depleted or is close to depletion (step 640). If none of the buckets of minutes has been depleted, the PCAS continues to monitor all of the ongoing calls (step 642).

If a particular cardholder depletes his bucket of minutes, a determination is made as to whether there are adequate minutes remaining in the overall account to allocate an additional bucket of minutes to the cardholder (step 644). If there are not adequate minutes remaining in the account, the cardholder is notified of the need to replenish minutes in the account (step 648). If there are adequate minutes, another bucket of a predetermined number of minutes are allocated to the cardholder (step 650). The bucket of minutes is then subtracted from the overall account balance (step 652).

The PCAS also monitors each ongoing call to detect call completion (step 654). If no calls are completed, the goes back to step 640. If a call is completed, remaining minutes allocated to the cardholder are returned to the overall account balance (step 656). Next, a determination is made as to whether the particular cardholder wishes to make another call (step 658). If the cardholder wishes to make another call, the process is repeated beginning at step 628. If the cardholder is not making additional calls, the PCAS continues to monitor all other ongoing calls (step 660).

As indicated above, in some embodiments of the present invention, each card associated with a particular account is assigned a unique PIN. As such, monitoring of each particular card's activity is possible. This is particularly useful when the cards are distributed for business purposes. In addition to the ability to provide call detail records for each individual card, one of the cards in the account can be designated as a control card. As such, the control card can be provisioned with features that are not available to the other cards associated with the account. For example, in some instances the control card may be the only card capable of replenishing minutes to the prepaid card account. In addition, the control card may be the only card capable of placing call restrictions on one or more of the other prepaid cards associated with the particular account.

In an alternative embodiment, the PCAS may include a restriction directed to overall minute usage permitted by one or more of the cards in the account. For example, it may be determined that the overall minute balance can be used by any of the cardholders and that there is no minute usage limit. As such, one cardholder could theoretically deplete all of the minutes in the master account. In another scenario, each card may be assigned a maximum minute usage. The minute allotments may be equally divided among the cardholders or vary from card to card.

Another variation would limit the amount of minutes to be used by a cardholder in a given duration. The duration could be defined per call (e.g., 30 minutes maximum), a daily maximum (e.g., 100 minutes per day) or a weekly maximum (e.g., 500 minutes per week). The specified duration and limit can be defined using the control card for the particular account based on business or other needs (e.g., family needs in the case of a family account).

While the present invention has been described in connection with the illustrated embodiments, it will be appreciated and understood that modifications may be made without departing from the true spirit and scope of the invention. It is to be understood that the particular embodiments shown and described by way of illustration are in no way intended to be considered limiting. Therefore, references to details of particular embodiments are not intended to limit the scope of the claims, which in themselves recite only those features regarded as essential to the invention.

We claim:

1. A method comprising:
   receiving, from one of a plurality of prepaid card users, each of the plurality of prepaid card users associated with a respective one of a plurality of prepaid cards associated with an account, a request to establish a telephone call to a destination telephone number;
   determining call restrictions placed on the respective prepaid card by a control card associated with the account;
   connecting the telephone call;
   monitoring the telephone call to verify that the call restrictions are maintained;
   determining if the account has adequate minutes to allot to each of a plurality of telephone calls, each call associated with one of the plurality of prepaid card users;
   if there are adequate minutes, allotting a number of minutes to each of the plurality of telephone calls;
   contemporaneously connecting each of the plurality of telephone calls to a respective destination telephone number received from an associated prepaid card user;
   determining that one of the plurality of telephone calls has been completed;
   querying a prepaid card user associated with the one of the plurality of telephone calls to determine if the prepaid card user associated with the one of the plurality of telephone calls wishes to make an additional telephone call;
   if the prepaid card user associated with the one of the plurality of telephone calls wishes to make an additional telephone call, receiving a second destination telephone number from the prepaid card user associated with the one of the plurality of telephone calls;
   determining if the additional telephone call is permitted; and
   if the additional telephone call is permitted, connecting the prepaid card user associated with the one of the plurality of telephone calls to the second destination telephone number by allotting a predetermined number of minutes to the additional telephone call.

2. The method of claim 1 further comprising:
   determining if one of the plurality of telephone calls has depleted the number of minutes;
   in response to determining that one of the plurality of telephone calls has depleted the number of minutes, determining if the account has adequate minutes to allot additional minutes to the one of the plurality of telephone calls; and
   if the account has adequate minutes, allotting an additional number of minutes to the one of the plurality of telephone calls.

3. The method of claim 2 further comprising:
   if the account does not have adequate minutes, notifying a prepaid card user associated with the one of the plurality of telephone calls of the need to replenish minutes in the account.

4. The method of claim 3 further comprising:
   receiving a request from the prepaid card user associated with the one of the plurality of telephone calls, to replenish minutes to the account.

5. The method of claim 1, wherein each of the plurality of prepaid cards has a different PIN.

6. The method of claim 1, wherein each of the plurality of prepaid cards has a same PIN.

7. The method of claim 1 wherein the call restrictions include limiting a number of minutes used by the prepaid card user associated with the respective prepaid card.

8. The method of claim 1 wherein the call restrictions include limiting a number of minutes used by the prepaid card user associated with the respective prepaid card in a week.

9. The method of claim 1 wherein the call restrictions include limiting a number of minutes used by prepaid card user associated with the respective prepaid card for a call.

10. The method of claim 1 wherein the call restrictions include limiting a number of minutes used by the prepaid card user associated with the respective prepaid card in a month.

11. The method of claim 1 wherein the call restrictions include limiting usage of the respective prepaid card to a predetermined time period.

12. The method of claim 11 wherein the predetermined time period is weekdays.

13. The method of claim 1 wherein the call restrictions include denying usage of the respective prepaid card for international calls.

14. The method of claim 1 further comprising:
   generating a call detail record for each call made by the prepaid card user associated with the respective prepaid card.

15. The method of claim 14 wherein the call detail record is available to the prepaid card user associated with the respective prepaid card.

* * * * *

UNITED STATES PATENT AND TRADEMARK OFFICE
CERTIFICATE OF CORRECTION

| | | |
|---|---|---|
| PATENT NO. | : 8,064,581 B1 | Page 1 of 1 |
| APPLICATION NO. | : 11/897685 | |
| DATED | : November 22, 2011 | |
| INVENTOR(S) | : Allen et al. | |

It is certified that error appears in the above-identified patent and that said Letters Patent is hereby corrected as shown below:

On the Title page, after Item (73), "Assignees", change "New York University, New York, NY (US)" to --Wal-Mart Stores, Inc., Bentonville, AR (US)--

Signed and Sealed this
Twenty-eighth Day of February, 2012

David J. Kappos
*Director of the United States Patent and Trademark Office*